US005572813A

United States Patent [19]

Matsubara

[11] Patent Number: 5,572,813

[45] Date of Patent: Nov. 12, 1996

[54] TAG TO BE ATTACHED ONTO A FISHING ROD

[75] Inventor: Teiji Matsubara, Chiba, Japan

[73] Assignee: Daiwa Seiko, Inc., Tokyo, Japan

[21] Appl. No.: 261,121

[22] Filed: Jun. 14, 1994

[30] Foreign Application Priority Data

Jun. 25, 1993 [JP] Japan .............................. 5-039718 U

[51] Int. Cl.$^6$ .............................. G06F 3/10

[52] U.S. Cl. .............................. 40/299; 40/124.1; 40/317

[58] Field of Search .............................. 40/299, 316, 124.1, 40/539, 306, 665, 317; 229/115, 106, 107; 43/25

[56] References Cited

U.S. PATENT DOCUMENTS

| | | | |
|---|---|---|---|
| 218,479 | 8/1879 | Bolchini | 229/115 |
| 799,841 | 9/1905 | Essex | 40/665 |
| 1,542,894 | 6/1925 | Langner | 40/317 |
| 2,149,959 | 3/1939 | Gilbert | 40/539 |
| 2,232,088 | 2/1941 | Waters | 229/106 X |
| 2,894,673 | 7/1959 | Vuillemenot | 229/115 X |
| 3,471,958 | 10/1969 | Westin | 40/124.1 X |
| 3,809,310 | 5/1974 | Vander Lugt, Jr. | 229/106 X |
| 4,726,140 | 2/1988 | Mears | 43/25 |

FOREIGN PATENT DOCUMENTS

| | | | |
|---|---|---|---|
| 454597 | 6/1968 | Switzerland | 40/124.1 |

*Primary Examiner*—Joanne Silbermann
*Attorney, Agent, or Firm*—Longacre & White

[57] ABSTRACT

The invention concerns a tag to be mounted on a fishing rod, which enables a customer at a store to read easily the specifications of the rod printed on the tag without touching the tag by hand and also to confirm simply the handling conditions of the rod without fluttering the tag. The tag is mounted on the fishing rod in such a manner that one side of the tag is secured to one of fishing line guides on the rod, a rod receive surface of the tag is put on the rod, and the other side of the tag is tied to the rod by a connecting wire member. The tag is bent formed from a rectangular paper, resin film or the like into a triangular shape in section and includes the rod receive surface and art least one display surface. The specifications of the fishing rod, pictures and the like are printed or affixed on the display surfaces.

17 Claims, 8 Drawing Sheets

TAG TO BE ATTACHED ONTO A FISHING ROD

BACKGROUND OF THE INVENTION

1. Field of the Invention

The present invention relates to a tag to be mounted on a fishing rod. The tag is formed to be affixed along the length of the fishing rod so as to readily display the specifications of the rod and to remain stabile during movement of the rod.

2. Description of Related Art

Conventionally, a tag is mounted or attached onto a fishing rod in such a manner that the tag 6 is hung from a fishing line guide 3 of the fishing rod by means of a string or rubber 7 as shown in FIG. 13.

When the tag is mounted onto the fishing rod in the above-mentioned manner, in displaying the fishing rod at the store, it is impossible to specify the direction of the surface of the tag on which the specifications of the rod are printed and, therefore, a customer must take the tag in one hand when reading the specifications. That is, it is difficult for the customer to read the specifications printed on the tag.

Also, in general, the customer tries to swing the fishing rod in order to confirm how the fishing rod feels. However, in this operation, the tag is fluttered which makes it difficult for the customer to confirm the handling conditions of the fishing rod.

SUMMARY OF THE INVENTION

In view of the above-circumstances, the present invention aims at eliminating the drawbacks found in case where a tag is mounted on a fishing rod in the above-mentioned manner. Accordingly, it is an object of the invention to provide a tag capable of being mounted on a fishing rod in such a manner that at the store a customer can read easily the contents of the specifications printed on the tap without touching the tag and also can simply confirm the handling conditions of the fishing rod without fluttering the tag while the tag remains mounted on the rod.

In attaining the above object, according to the present invention, there is provided a tag to be mounted on a fishing rod in which the tag includes a rod receiving surface having given length and width and abatable to the fishing rod, and the tag is mounted on the fishing rod in such a manner that the rod receiving surface is kept in adjacent to or in contact with the fishing rod.

According to the invention, the tag is mounted on the fishing rod in such a manner that a surface of the tag on which the specifications of the rod, pictures and the like are printed or affixed is held to extend in the longitudinal direction of the fishing rod so that a customer is able to read the specifications and the like without touching the tag.

Also, when the customer tries to confirm the handling conditions of the fishing rod, the customer can swing the fishing rod 2 without fluttering the tag 1 while the tag is left mounted on the rod 2.

DETAILED DESCRIPTION OF THE PREFERRED EMBODIMENTS

Figure 1:
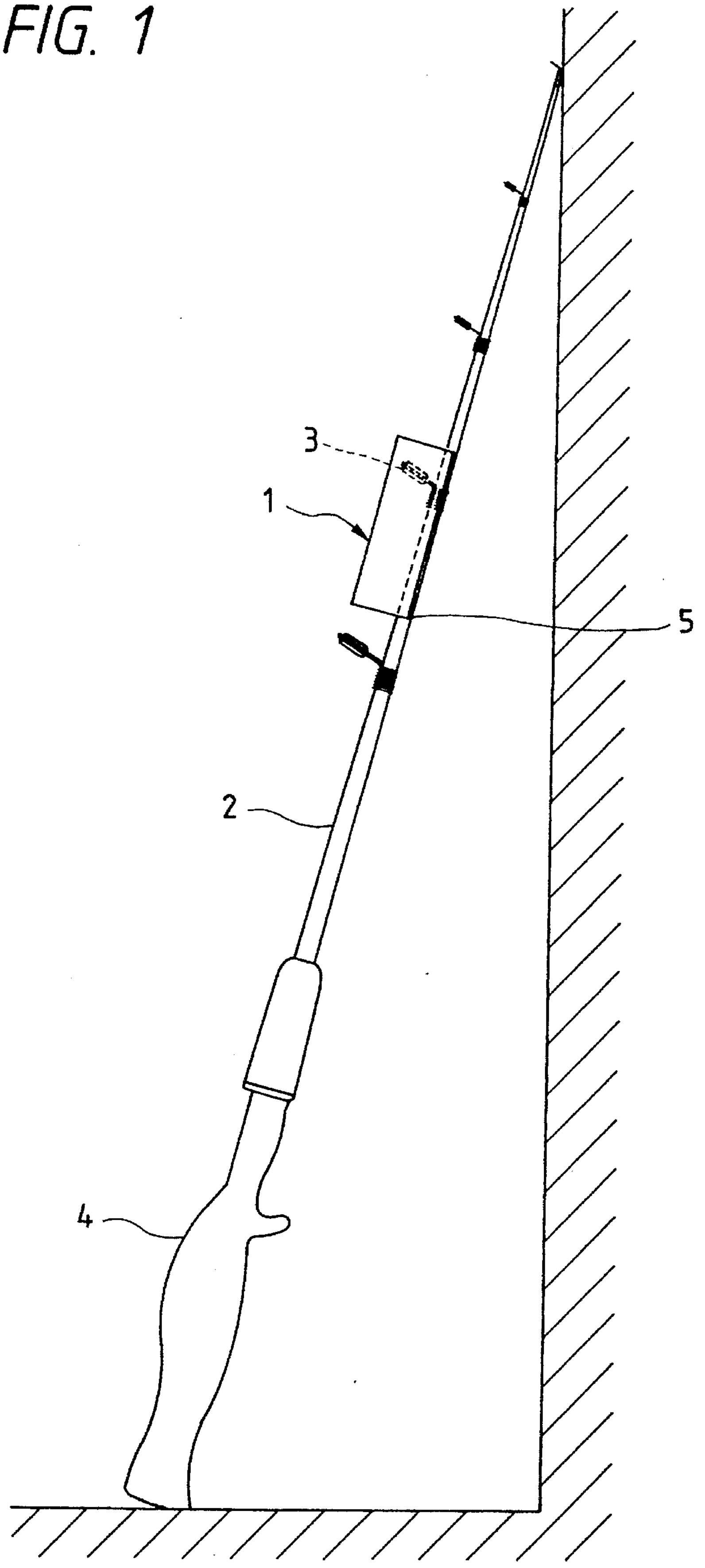
FIG. 1 is a perspective side view of a fishing rod with a tag mounted thereon according to a first embodiment of the invention.

Description will be given hereinbelow of the various embodiments of a tag to be mounted onto a fishing rod according to the invention with reference to the accompanying drawings. In FIGS. 1 to 4, there is shown a first embodiment of a tag according to the invention.

According the first embodiment, one side of the tag 1 is secured to one of fishing line guides 3 respectively provided in a fishing rod 2, the rod receiving surface A defined by bottom parts 1*a* and 1*b* one over another is put on and brought into contact with the fishing rod 2, and the other side of the tag 1 is mounted to the fishing rod 2 by means of a connecting member 5.

The tag 1 is formed from a rectangular paper, resin film or the like and is capable of being folded into a substantially triangular shape including a bottom surface, i.e., the rod receive surface A defined by the bottom parts 1*a* and 1*b*, and inclined surfaces B and C respectively defined by side parts 1*c* and 1*d*.

Specifications, pictures and the like are printed on the inclined surfaces B and C.

The fishing rod 2, on which the tag 1 is mounted in contact therewith, is made up of a fiber reinforced synthetic resin rod tube with, for example, a plurality of large and small metal fishing line guides 3 fixed thereto, and includes on the base side thereof a handle 4 which is fixed to the rod 2 and has a reel leg mounting portion.

The bottom parts 1*a* and 1*b* of the tag 1 are arranged such that they have a given length and a relatively narrow width.

Substantially centrally of the respective widths and on one longitudinal sides of the bottom parts 1*a* and 1*b*, there are formed longitudinally elongated through-holes 1*e* and 1*f* arranged coincident with each other when the bottom parts 1*a* and 1*b* are superimposed on each other.

On the other longitudinal side of the bottom part 1*a*, there are formed through holes 1*g* and 1*h* which are respectively disposed near to the side parts 1*c* and 1*d* and are elongated in the longitudinal direction thereof.

Similarly, on the other longitudinal side of the bottom part 1*b*, there are opened up through holes 1*i* and 1*j* which are respectively disposed near to the side parts 1*c* and 1*d* and are elongated in the longitudinal direction thereof.

The through holes are formed such that, when the through holes 1*g* and 1*i* are superimposed on each other, then they can form one hole and, when the through holes 1*h* and 1*j* are superimposed on each other, then they can form one hole.

The connecting member 5 can be formed in a long rectangular shape, for example, by inserting a wire between two thin synthetic resin sheets. Of course, a string or rubber band may be used.

Figure 2:
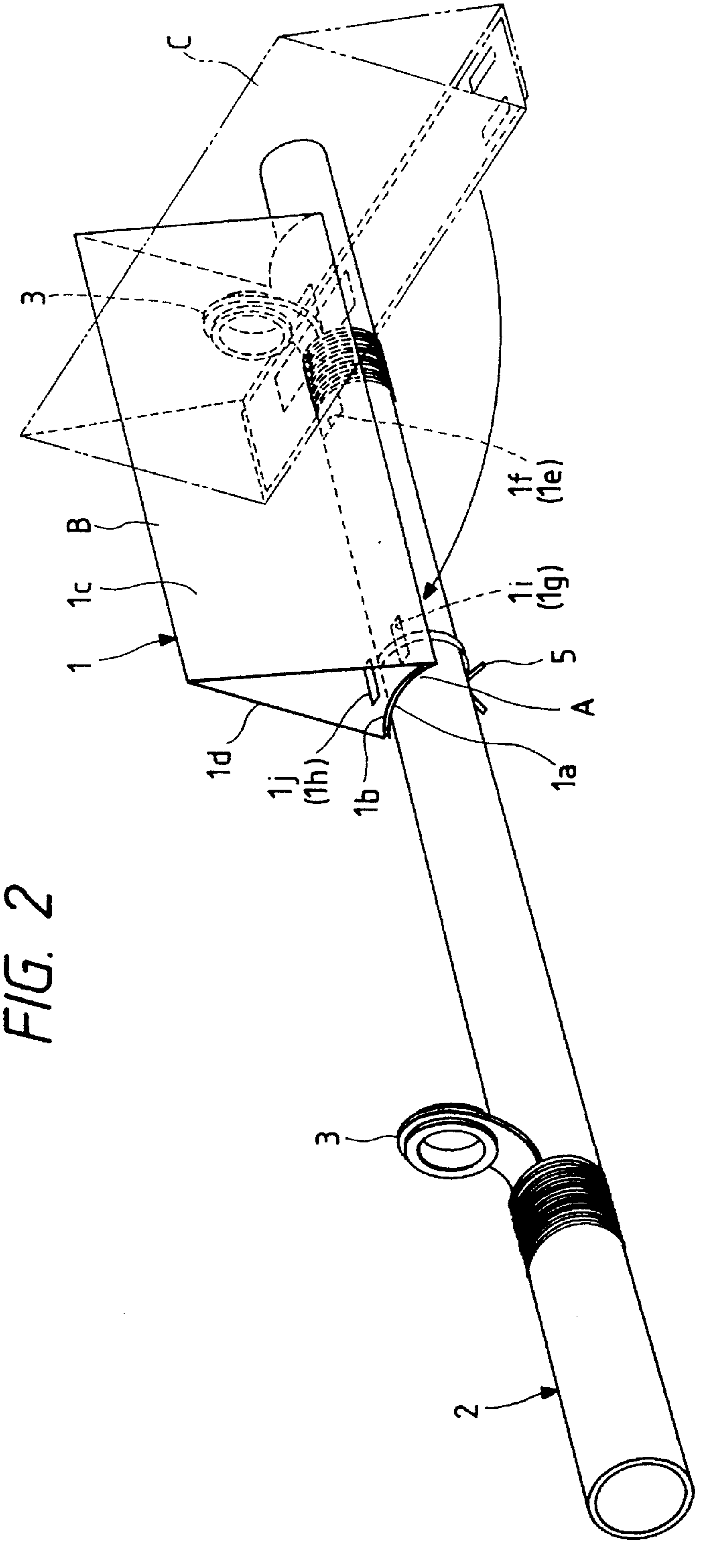
FIG. 2 is an enlarged perspective view of the appearance of the tag mounted on the fishing rod shown in FIG. 1.
Figure 3:
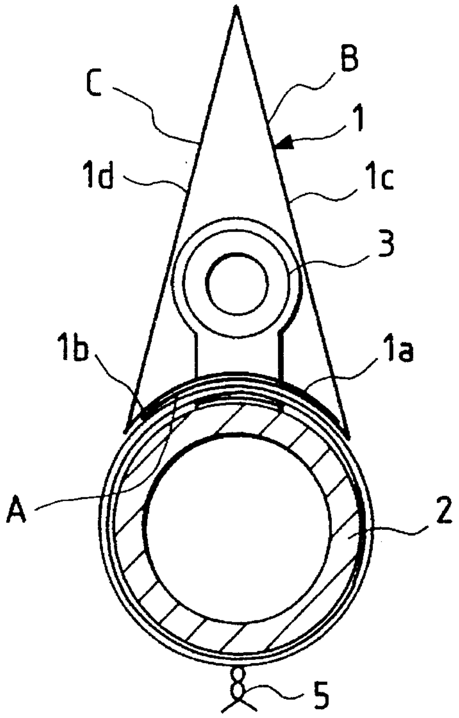
FIG. 3 is a sectional back view of the fishing rod with the tag mounted thereon in the first embodiment.
Figure 4:
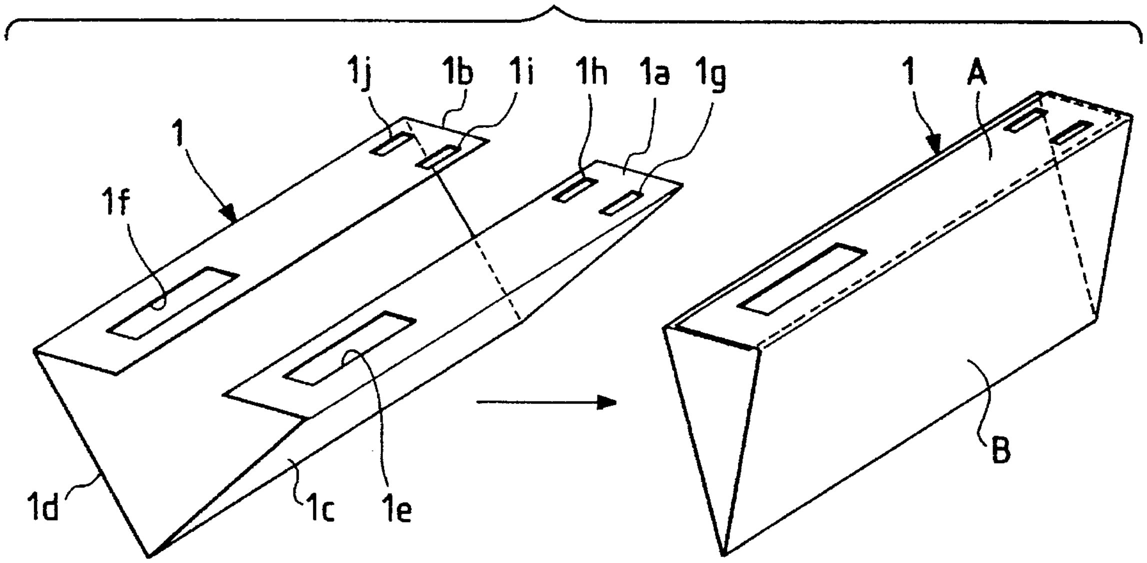
FIG. 4 is a perspective view of the bottom surface side of the tag of the first embodiment.

When the tag 1 is mounted on the fishing rod 2, as shown by two-dot chained lines in FIG. 2, with the tag 1 disposed perpendicular to the fishing rod 2, the through holes 1*e* and 1*f* formed in the bottom parts 1*a* and 1*b* are fitted with one of the fishing line guides 3.

Next, the tag 1 is rotated to a position shown by a solid line in FIG. 2 so that the tag 1 extends in the longitudinal direction of the fishing rod 2 and one side of the tag 1 is secured to the fishing line guide 3.

After then, the connecting member 5 is inserted into the through holes 1*g* and 1*i* as well as into the through holes 1*h* and 1*j* and, if the connecting member 5 is twisted on the lower side of the fishing rod 2, then the tag 5 can be tied to the lower side of the fishing rod 2.

The rod receive surface A disposed on the other side of the tag 1 tied by the connecting member 5 is curved along the outer periphery of the fishing rod 2.

If the tag 1 is mounted on the fishing rod 2 in the above-mentioned manner, then the inclined surfaces B and C defined by the side parts 1*c* and 1*d* of the tag 1 are directed along the longitudinal direction of the fishing rod 2 respectively, so that the specifications, pictures and the like affixed to or printed on the inclined surfaces B and C can be seen without touching the tag 1 by hand.

Also, when confirming the handling conditions of the fishing rod, even if a customer grips the handle 4 of the fishing rod 2 and swings the rod 2, the customer can confirm the rod conditions without fluttering the tag 1 while the tag 1 is left mounted, because the two sides of the tag 1 in the longitudinal direction thereof are mounted on the fishing rod 2.

If the tag 1 is mounted on the fishing rod in the above manner, then the customer at the store can read easily the contents of the specifications of the fishing rod without touching the tag of the rod, and also can simply confirm the handling conditions of the fishing rod in such a manner that the tag 1 is not fluttered but is left mounted on the fishing rod without producing any strange sound.

The tag 1 is removably mounted to the fishing rod 2 such that it can be easily removed from the fishing rod 2 by disconnecting the connecting member 5.

Figure 5:
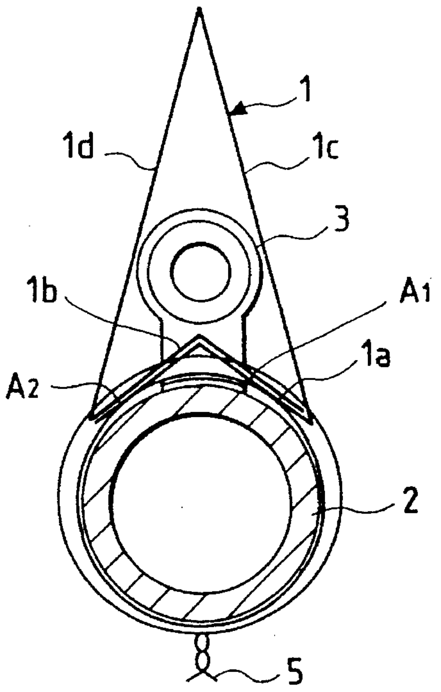
FIG. 5 is a sectional back view of a fishing rod with a tag mounted thereon according to a second embodiment of the invention.
Figure 6:
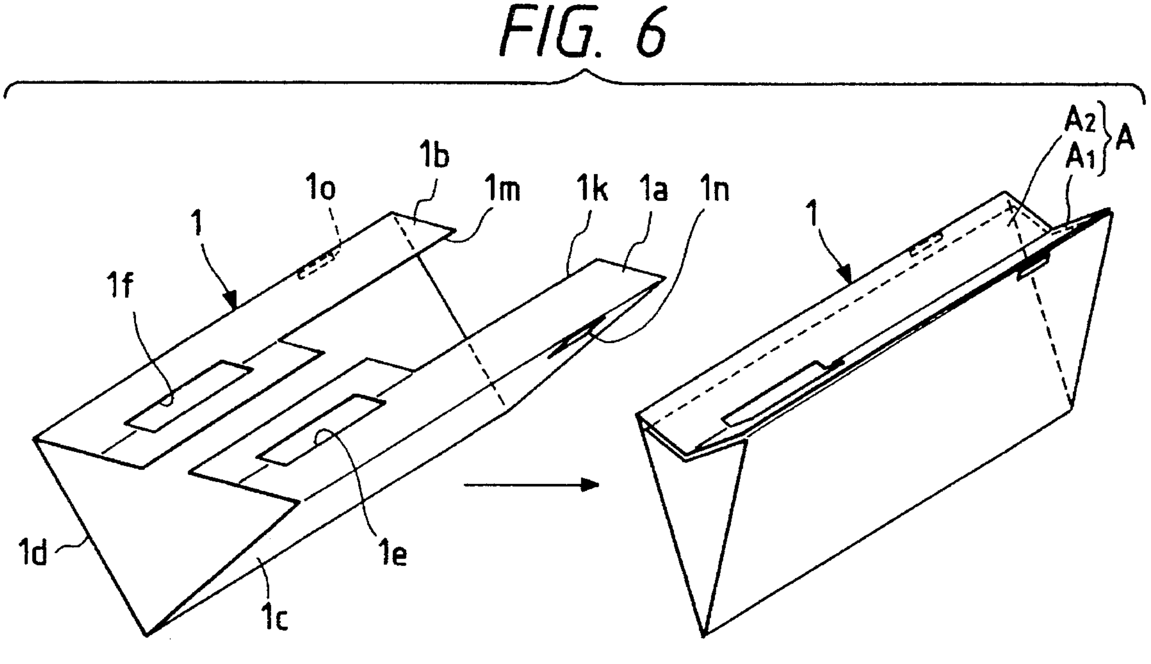
FIG. 6 is a perspective view of the bottom surface side of the tag shown in FIG. 5.

Referring now to FIGS. 5 and 6, there is shown a second embodiment of a tag to be mounted on a fishing rod according to the invention. In particular, FIG. 5 is a section view of the fishing rod with the tag mounted thereon, and FIG. 6 is a perspective view of the bottom surface side of the tag employed in the second embodiment.

In the second embodiment, there are formed two cut-away portions 1*k* and 1*m* on the longitudinally rear but opposed portions of the bottom parts 1*a* and 1*b* of the tag 1.

There are formed two through holes 1*n* and 1*o* which are respectively disposed on the side parts 1*c* and 1*d* sides of the tag 1 and are elongated in the longitudinal direction thereof.

The bottom parts 1*a* and 1*b* disposed on the other side of the tag 1 tied by the connecting member 5 are bent at the central portion of the bottom parts 1*a* and 1*b* and on the outer periphery of the fishing rod 2 to thereby forming a pair of angular related rod receive surfaces $A_1$ and $A_2$.

Figure 7:
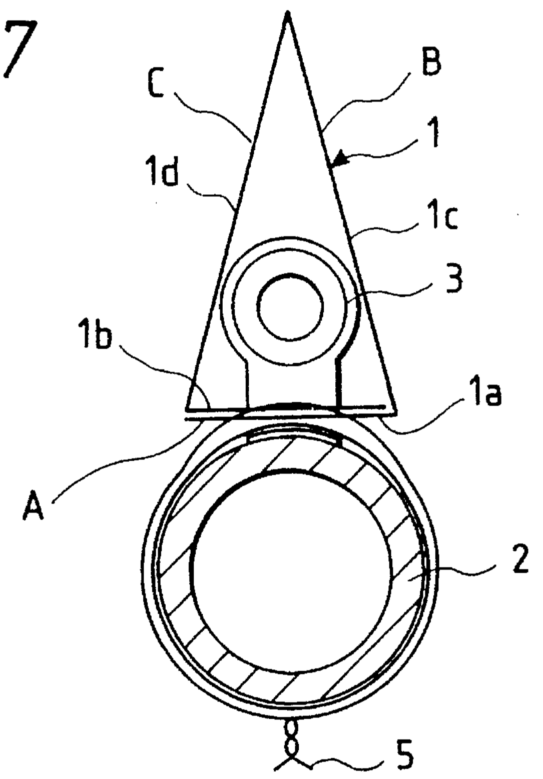
FIG. 7 is a sectional back view of a fishing rod with a tag mounted thereon according to a third embodiment of the invention.

Referring now to FIG. 7, there is shown a third embodiment of a tag according to the invention. FIG. 7 is a sectional back view of a fishing rod with the tag mounted thereon.

In the third embodiment, the through holes 1*g*, 1*h* and through holes 1*i*, 1*j* are formed such that the distances between them are narrower than those in the first embodiment.

As a result of this, even when the tag 1 is affixed by the connecting member 5, the rod receive surface A defined by the bottom parts 1*a* and 1*b* are shaped in a linear state or remain planer.

Figure 8:
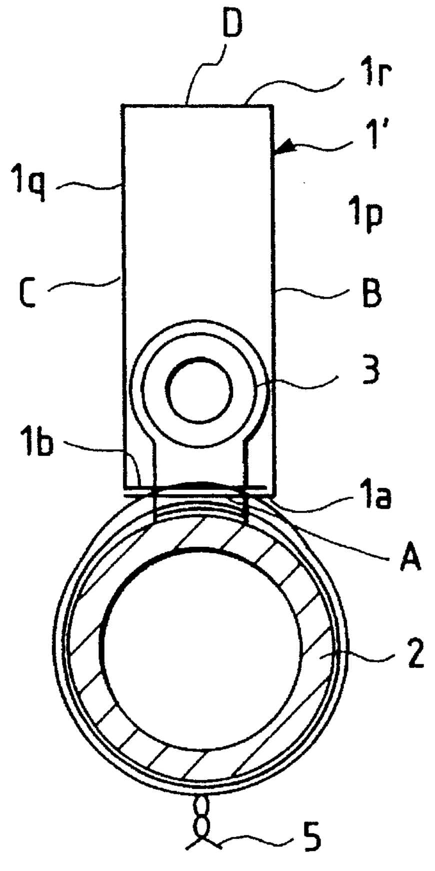
FIG. 8 is a sectional back view of a fishing rod with a tag mounted thereon according to a fourth embodiment of the invention.
Figure 9:
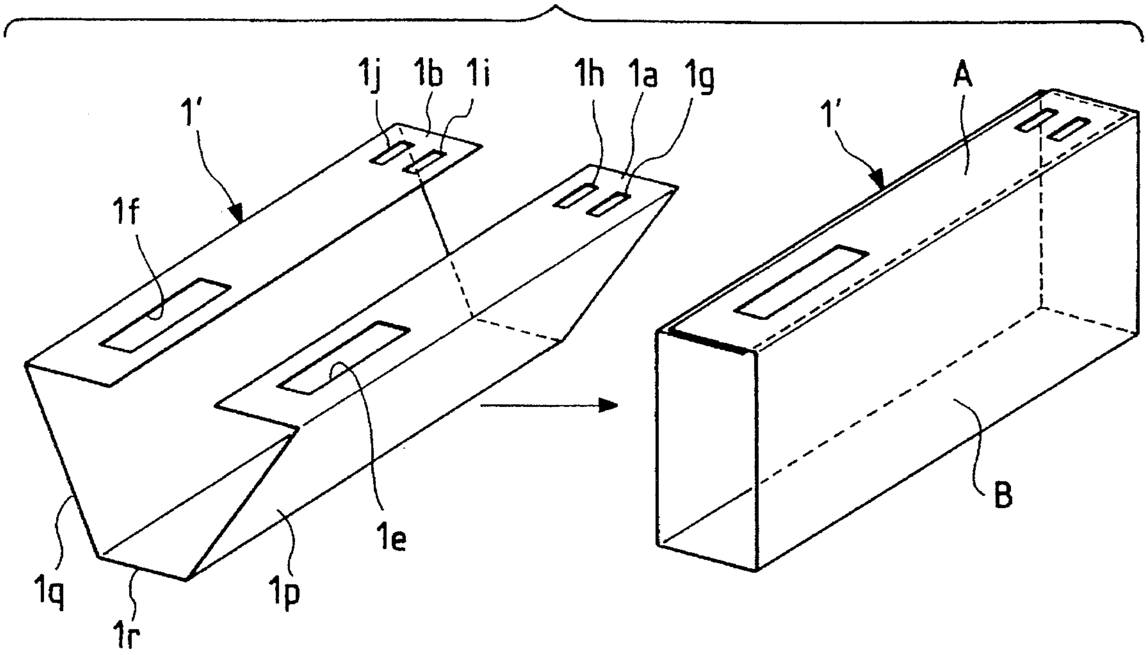
FIG. 9 is a perspective view of the bottom surface side of the tag shown in FIG. 8.

In FIGS. 8 and 9, there is shown a fourth embodiment of a tag according to the invention. In particular FIG. 8 is a sectional back view of a fishing rod with the tag mounted thereon, and FIG. 9 is a perspective view of the bottom surface side of the tag.

In the fourth embodiment, a tag 1' is bent formed so as to have a rectangular section and includes a planer rod receiving surface A defined by bottom parts 1*a* and 1*b*, two vertical surfaces B and C defined by side parts 1*p* and 1*q*, and a horizontal surface D defined by a top part 1*r*.

The specifications of the rod, pictures and the like are printed on or affixed to the vertical surfaces B, C and/or D.

The remaining portions of the fourth embodiment are substantially the same as the third embodiment.

Figure 10:
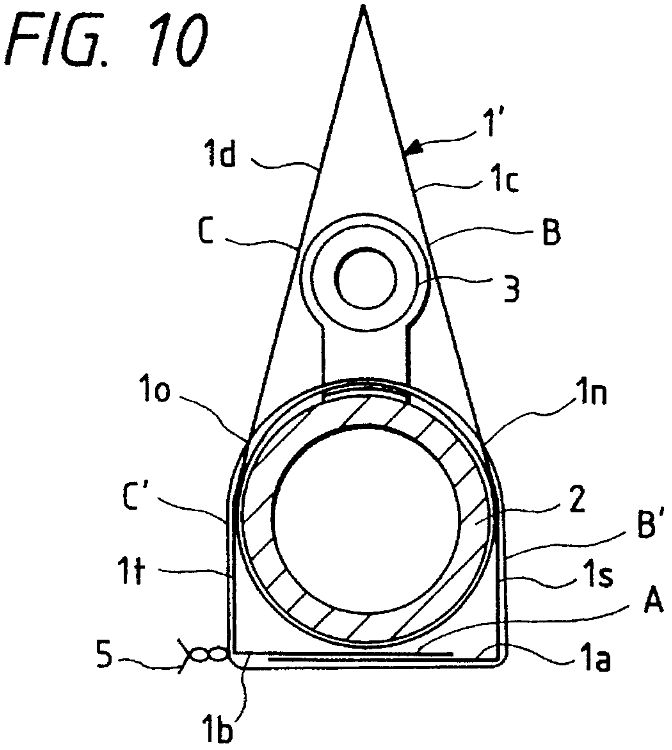
FIG. 10 is a sectional back view of a fishing rod with a tag mounted thereon according to a fifth embodiment of the invention.

Now, in FIG. 10, there is shown a fifth embodiment of a tag according to the invention. FIG. 10 is a sectional back view of a fishing rod with a tag mounted thereon.

In the fifth embodiment, there are provided two inclined surfaces B and C defined by side parts 1*c* and 1*d*, two vertical surfaces B' and C' respectively defined by lower parts 1*s* and 1*t* formed continuously from the bottom portions of the side parts 1*c* and 1*d*, and a rod receive surface A defined by the bottom parts 1*a* and 1*b* respectively formed downwardly of the lower parts 1*s* and 1*t*.

Both the lateral side of the outer peripheral surface of the fishing rod 2 are enclosed by the vertical surfaces B' and C' defined by the lower parts 1*s* and 1*t*.

On the side parts 1*c* and 1*d* of the tag 1', similarly to the second embodiment, there are opened up through holes 1*n* and 1*o* which are respectively long in the longitudinal direction thereof. The connecting member 5 passes through the holes 1*n* and 1*o* so as to surround the fishing rod 2. It is noted that the connecting member 5 is disposed along the exterior surfaces of lower parts 1*s*, 1*t* and bottom parts 1*a*, 1*b*.

Figure 11:
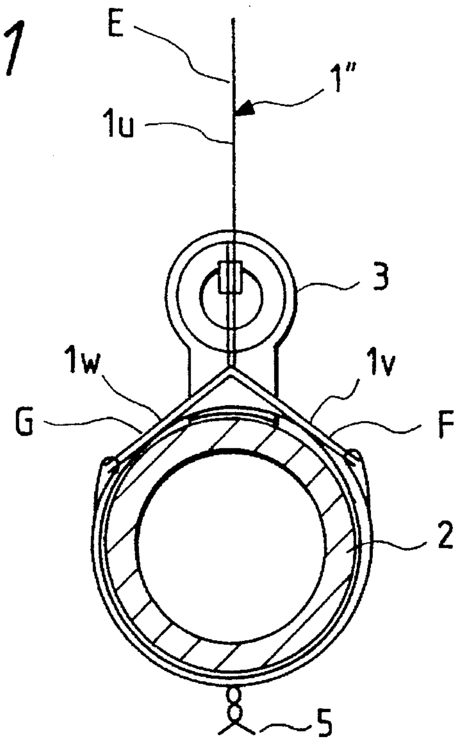
FIG. 11 is a sectional back view of a fishing rod with a tag mounted thereon according to a sixth embodiment of the invention.
Figure 12:
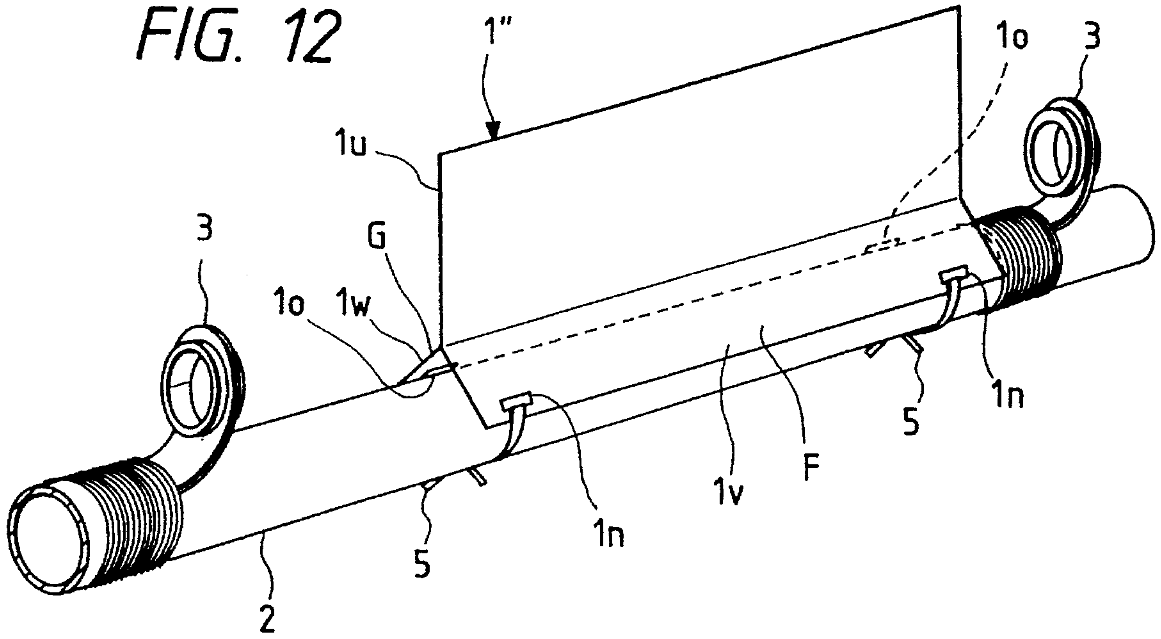
FIG. 12 is a perspective view of the fishing rod with the tag mounted thereon in the sixth embodiment.
Figure 13:
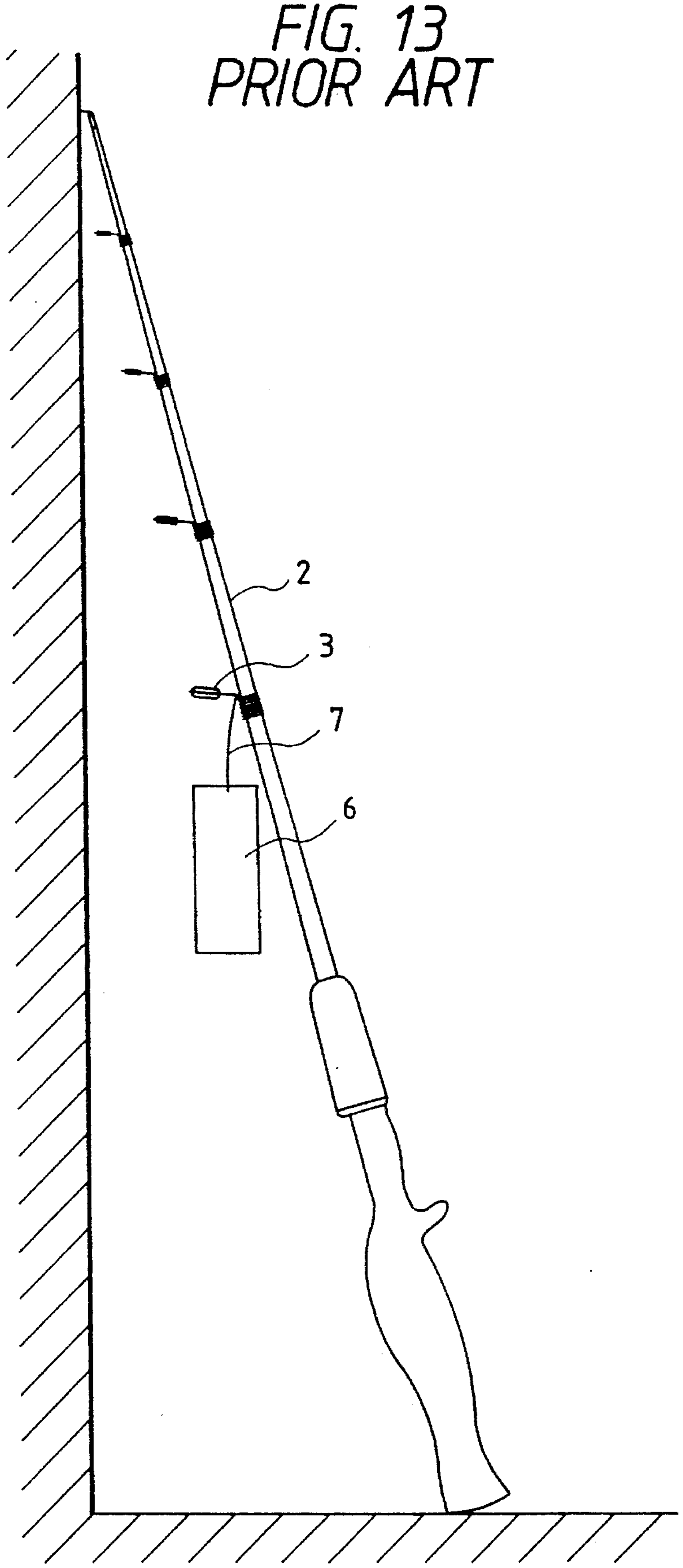
FIG. 13 PRIOR ART
FIG. 13 is a perspective side view of a fishing rod with a tag mounted thereon in a conventional manner.

Referring now to FIGS. 11 and 12, there is shown a sixth embodiment of a tag according to the invention. In particular, FIG. 11 is a sectional back view of a fishing rod with the tag mounted thereon, and FIG. 12 is a perspective view of the fishing rod with the tag mounted thereon.

According to the sixth embodiment, a tag 1" can be formed by bending a sheet of paper or the like into an inverted-Y shape, or can be formed into an inverted-Y shape by a combination of a sheet of bent formed paper with another sheet of paper or the like.

The tag 1" includes a vertical surface E defined by a top part 1*u* and two rod received surfaces F and G defined by bottom parts 1$v$ and 1$w$ which are respectively put on the outer peripheries of the fishing rod 2.

The specification of the rod, pictures or the like are printed on the two sides of the vertical surface E.

On the longitudinal front and rear sides of the bottom parts 1$v$ and 1$w$, there are opened up two sets of through holes 1$n$ and 1$o$ which are respectively elongated in the longitudinal direction thereof similarly to those opened up on the bottom parts 1$a$ and 1$b$ in the first embodiment.

The rod receive surfaces F and G of the tag 1", are put on the outer peripheries of the fishing rod 2 and are tied thereto by two connecting members 5, respectively.

The above-mentioned tags 1, 1' and 1" are removably mounted to the fishing rod 2 such that they can be easily removed from the fishing rod 2 by disconnecting the connecting member(s) 5.

Since the present invention is structured in the above-mentioned manner, at the store, a customer can easily read the contents of the specifications of the fishing rod printed on the tag without touching the tag by hand and also the customer can simply confirm the handling conditions of the fishing rod without fluttering the tag or producing any strange sound while the tag remains mounted thereon. That is, the invention can provide a fishing rod which can offer practically excellent effects.

While the foregoing invention has bee particularly shown and described with reference to several embodiments, it will be understood by those having skill in the art that various changes in form and detail may be made without departing from the spirit and scope of the invention.

What is claimed is:

1. A combination of a fishing rod and a tag to be mounted on said fishing rod, wherein the tag defines a rod receiving surface having given length and width; and includes mounting means for mounting the tag onto the fishing rod in such a manner that the rod receiving surface is kept in contact with a curved outer surface of the fishing rod;

wherein said tag includes a bottom part for defining the rod receiving surface, said bottom part being formed with an elongated hole having a length larger than a maximum lateral length of an eyelet provided on the fishing rod and a width smaller than the maximum lateral length of the eyelet.

2. The combination according to claim 1, wherein the tag is a three-dimensional shape providing the rod receiving surface and at least one display surface adapted to receive a specification of the rod.

3. The combination according to claim 2, wherein the tag is formed from a rectangular sheet having certain rigidity, said sheet being bent into said three dimensional shape.

4. The combination according to claim 3, wherein the rectangular sheet includes two bottom parts at opposite lateral ends thereof, the bottom parts being laid one over the other to define the rod receiving surface when the sheet is bent into the three-dimensional shape.

5. The combination according to claim 4, wherein the bottom parts are respectively formed with elongated holes which coincide with each other when the bottom parts are laid one over the other, whereby the bottom parts are prevented from shifting with respect to each other when the tag is mounted on the rod by the mounting means.

6. The combination according to claim 2, wherein the specification is printed on said display surface.

7. The combination according to claim 2, wherein the specification is affixed to said display surface.

8. The combination according to claim 1, wherein the rod receiving surface is curved.

9. The combination according to claim 1, wherein the rod receiving surface is planer.

10. The combination according to claim 1, wherein the rod receiving surface is divided into two surfaces inclined relative to each other.

11. A combination of a fishing rod and a tag to be mounted on said fishing rod and adapted to display a specification of said rod, said tag comprising:

a rod receiving surface having given length and width;

at least one display surface affixed to said receiving surface and adapted to receive said specification of the rod; and mounting means for mounting the tag onto the fishing rod, wherein said rod receiving surface is maintained at a substantially fixed orientation with respect to said rod;

wherein said tag includes a bottom part for defining the rod receiving surface, said bottom part being formed with an elongated hole having a length larger than a maximum lateral length of an eyelet provided on the fishing rod and a width smaller than the maximum lateral length of the eyelet, whereby the eyelet is adapted to be inserted through the elongated hole when the rod and tag are in a first angular relationship with respect to each other, and the tag is retained on the rod by the eyelet and the elongated hole when the rod and the tag are in a second angular relationship with respect to each other.

12. The combination according to claim 11, wherein the tag is formed from a rectangular sheet having a predetermined rigidity, said sheet being bent into a three dimensional shape.

13. The combination according to claim 12, wherein the rectangular sheet includes two bottom parts at opposite lateral ends thereof, the bottom parts being laid one over the other to define the rod receiving surface when the sheet is bent into the three-dimensional shape.

14. The combination according to claim 13, wherein the bottom parts are respectively formed with elongated holes which coincide with each other when the bottom parts are laid one over the other, whereby the bottom parts are prevented from shifting with respect to each other when the tag is mounted on the rod by the mounting means.

15. The combination according to claim 11, wherein said tag is formed with a plurality mounting openings at discrete positions along a longitudinal dimension of said rod, said mounting means affixing said tag to said rod by means of said mounting openings.

16. The combination according to claim 15, wherein said mounting means comprises at least one affixing means for affixing said tag to said rod, said affixing means adapted to pass through at least one of said openings and circumscribe said rod.

17. The combination according to claim 11, wherein said tag is affixed to said rod at a plurality of discrete positions along a longitudinal dimension of said rod.

* * * * *